United States Patent
Foo (10) Patent No.: US 6,231,198 B1
(45) Date of Patent: *May 15, 2001

(54) REFLECTIVE OPTICAL INTEGRATOR

(75) Inventor: Leslie D. Foo, San Jose, CA (US)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/024,879

(22) Filed: Feb. 17, 1998

(51) Int. Cl.$^7$ ..................................... G02B 5/08
(52) U.S. Cl. ................ 359/855; 359/850; 359/852; 359/853
(58) Field of Search ................... 359/850, 851, 359/852, 853, 626, 627, 855, 869; 362/268

(56) References Cited

U.S. PATENT DOCUMENTS

| | | | |
|---|---|---|---|
| 3,645,606 | * 2/1972 | La Vantine | 359/853 |
| 4,087,682 | * 5/1978 | Kolodziej | 362/297 |
| 5,377,049 | * 12/1994 | Mueller et al. | 359/853 |
| 5,442,436 | * 8/1995 | Lawson | 359/858 |
| 5,993,010 | * 11/1999 | Ohzawa et al. | 362/298 |

OTHER PUBLICATIONS

Calculus With Analytic Geometry, Earl Swokowski, Prindle Weber &Schmidt (1977), p 262–266, Jun., 1977.*

* cited by examiner

Primary Examiner—Cassandra Spyrou
Assistant Examiner—Euncha Cherry
(74) Attorney, Agent, or Firm—Morrison & Foerster LLP (57) ABSTRACT

An optical integrator comprising a two dimensional array of mirror segments formed from an off-axis section of a parent parabolic surface. The mirror segments are arranged so that the focus of each mirror segment is in a plane. Incident collimated radiation is coaxial with the system axis. The secondary point source images are substantially aberration free.

24 Claims, 9 Drawing Sheets

REFLECTIVE OPTICAL INTEGRATOR

1. Field of the Invention

This invention relates generally to an apparatus and method of producing an array of point source images to improve the illumination uniformity of an illumination system. More specifically, this invention relates to an apparatus and method of producing an array of point sources using mirror segments based on an off-axis section of a parent parabolic surface.

2. Background of the Invention

The goal of an optical illumination system is to provide efficient energy transfer from a source to another location so that an image can be projected to a remote location. Specifically, a projection/illumination condenser produces an image of the light source in the pupil of a projection lens to produce uniform illumination across the projection lens field. The maximum illumination possible based on the brightness of the source and the diameter of the projection lens pupil occurs when the source image fills the projection lens pupil. This condition of maximum illumination is called Köhler illumination. In projection exposure lithography systems, the Köhler illumination condition is used to provide uniform illumination across the exposure field.

A basic illumination optical system consists of a source and a condenser lens. In this configuration the condenser lens forms an image of the source in the pupil of the projection optic. Higher performance illumination systems add additional components to collect and project more light into the pupil and also add components to increase the illumination uniformity across the pupil.

In the field of integrated circuit manufacturing, reduction projection lithography systems are being used to fabricate smaller and smaller linewidths. In such systems, it is crucial that the illumination intensity over the exposure area be extremely uniform because the photoresist used to record such intricate patterns is sensitive to illumination intensity. In addition, as integrated circuit linewidths continue to be reduced, so must the exposure wavelength of the reduction projection lithography systems. Currently, lithography systems have been proposed that use reflective optics to handle the exposure radiation to produce linewidths that are smaller than the linewidths that are theoretically possible with refractive optics. As those skilled in the art will appreciate, reflective optics are required when the wavelength of the exposure radiation drops below that which can be transmitted by conventional refractive optics (approximately 130 nm).

In current ultraviolet projection lithography systems a combination of mirrors and lenses is used to provide uniform illumination over the exposure area of the integrated circuit pattern that is recorded by the photoresist. One common method of providing a uniform exposure area has been to use a "fly's eye" lens array. The fly's eye lens array is composed of nearly identical lenslets arranged in a two-dimensional array with the optical axes of each of the lenslets essentially parallel to a common optical axis. When the fly's eye lens array is illuminated with collimated radiation, each lenslet in the array forms a secondary source image over a planar two-dimensional area. The secondary source image array increases the intensity uniformity over an extended area and is imaged by a condenser optic assembly to the pupil of the projection optical system. As discussed above, this type of illumination is Köhler illumination and provides efficient uniform illumination over the field of a projection lens.

The fly's eye array is useful in producing multiple secondary image sources where suitable refractive lens materials are available to transmit and refract the incident radiation. However, with x-rays a refractive material that transmits and refracts x-ray energy has not been found which is suitable. A reflective equivalent for the fly's eye array has been proposed in U.S. Pat. No. 5,581,605 to Murakami et al. The system proposed by Murakami et al. uses reflective spherical or toroidal mirror segments to generate secondary x-ray sources over a wide region. However, the uniformity of the secondary x-ray sources produced by such mirror segments is limited by optical aberrations. Spherical aberration is generated from the use of spherical or toroidal mirror segments and coma aberration is generated by the off-axis illumination of these mirror segments.

Accordingly, there is a need to provide an array of point sources located over a wide planar area that are not afflicted with either spherical or coma aberration. Preferably, such an array of point sources would be capable of providing suitable performance for exposure radiation that cannot be accommodated by conventional refractive optics.

SUMMARY OF THE INVENTION

According to the present invention, the foregoing and other advantages are attained by an optical integrator made up of a two dimensional array of mirror segments each based on an off-axis section of a parent parabolic surface. In one embodiment, the mirror segments are arranged so that the focus of each mirror segment is in a plane perpendicular to the propagation direction of incident coaxial collimated radiation. In a second embodiment, the mirror segments are arranged so that the focus of each mirror segment is in a plane that is tilted with respect to the optical axis of the parent parabolic surface.

The optical integrator of the present invention reflects the incident radiation to produce an array of secondary point sources. By choosing the appropriate off-axis segment of the parent parabolic surface from which the mirror segments are based, an extremely uniform array of secondary point sources is obtained. Such an array of point sources may be utilized in various optical systems, including an illumination system for use in a projection optical system. The use of the off-axis segment of the parent parabolic surface ensures that the resultant point sources will be substantially free of coma and spherical aberration.

These and other advantages of the present invention will become more apparent upon a reading of the detailed description of the preferred embodiments that follows, when considered in conjunction with the drawings of which the following is a brief description. It should be clear that the drawings are merely illustrative of the currently preferred embodiments of the present invention, and that the invention is in no way limited to the illustrated embodiment. As will be realized, the invention is capable of other embodiments and its several details are capable of modifications in various obvious aspects, all without departing from the scope of the invention. The present invention is best defined by the claims appended to this specification.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of the illustrative embodiments when read in conjunction with the accompanying drawings, wherein:

DETAILED DESCRIPTION

The following detailed description is of the presently preferred embodiments of the present invention. It is to be understood that while the detailed description is given utilizing the drawings briefly described above, the invention is not limited to the illustrated embodiments. In the detailed description, like reference numbers refer to like elements.

Referring now to the Figures, the preferred embodiments of the present invention will now be described.

Figure 1:
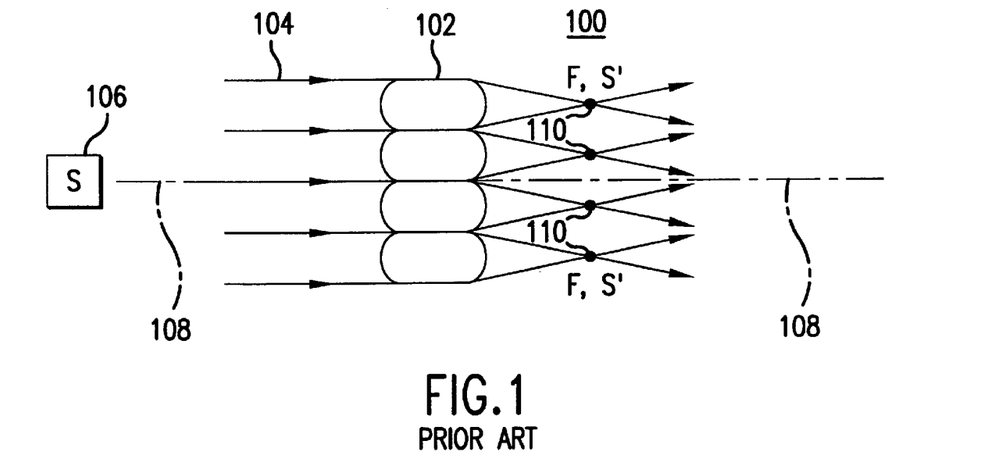
FIG. 1 is representative refractive lenslet fly's eye array as known in the prior art with the incident collimated light parallel to the optical axis.

FIG. 1 is a representative refractive lenslet fly's eye array 100 as known in the prior art. The lenslet fly's eye array 100 is a two dimensional array of individual fly's eye lenslets 102. Collimated radiation 104 from an on-axis source S 106 parallel to the optical axis 108 is incident on the fly's eye lenslets 102. The lenslet array 100 forms secondary point sources 110 along the same axis 108 as the incident collimated radiation 104. The numerical aperture (NA) of the point sources 110 is directly proportional to the focal length of the lenslets 102. The focal point F at 110 is coincident with the secondary image S' at 110. One of the uses of the lenslet fly's eye array 100 is to improve the illumination uniformity in a projection exposure lithography system by further homogenizing the source brightness to enhance the illumination uniformity of the projection exposure area. For example, the images 110 of the multiple sources produced by the fly's eye lenslet array 100 can be imaged into the pupil of a projection lens system by a condenser lens to produce a Köhler illumination condition. It should be appreciated that the secondary source images 110 suffer from standard aberrations and transmission properties associated with materials from which the individual refractive lenslets 102 are made. The lenslet fly's eye array 100 is not suitable for all types of systems. For example, the lenslet fly's eye array 100 is not suitable for an x-ray refractive system because materials that transmit and refract x-ray energy are not available.

Figure 2:
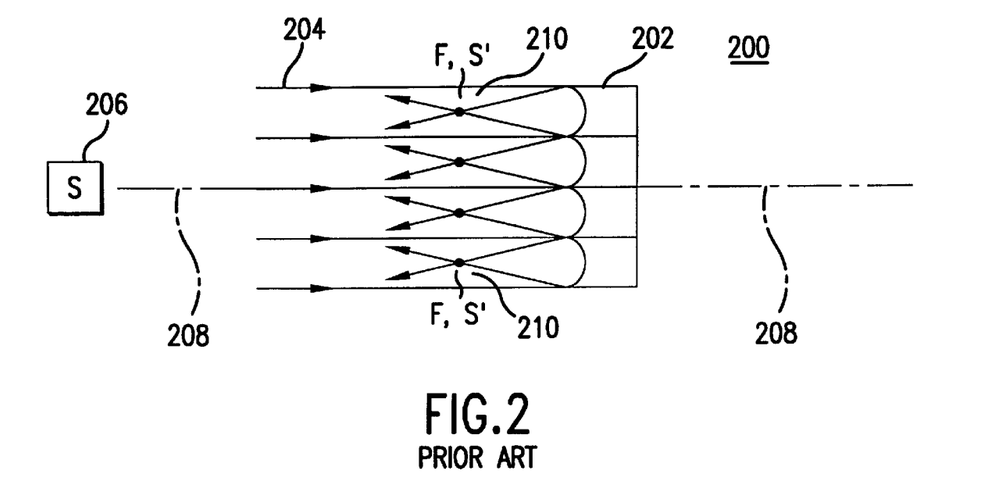
FIG. 2 is a spherical mirror equivalent of the refractive lenslet fly's eye array shown in FIG. 1 with the incident collimated light parallel to the optical axis.

FIG. 2 is a prior art reflective fly's eye equivalent of the refractive lenslet fly's eye array 100 shown in FIG. 1. The reflective fly's eye array 200 is a two dimensional array of individual fly's eye spherical mirrorlets 202 with collimated radiation 204 parallel to the system axis 208 incident on the individual fly's eye spherical mirrorlets 202. Collimated radiation 204 from an on-axis source S 206 parallel to the optical axis 208 is incident on the fly's eye spherical mirrorlets 202 and form secondary source images S' at 210 at the focal point F at 210. The secondary source images S' and the focal points F of the individual mirrorlets are coincident and are formed on a two-dimensional image plane along the same axis 208 as the incident collimated radiation 204. The secondary source images 210 suffer from spherical aberration that limit the individual image size. The incident and reflected radiation are coaxial if the incident radiation 204 is parallel to the system axis 208. This coaxial location is inconvenient and places severe limitations on this type of array as a viable replacement for a refractive fly's eye lenslet array. The main inconvenience is that the source images 210 are inaccessible since they are formed within the incoming collimated radiation 204 and cannot be accessed without some kind of beamsplitter.

Figure 3:
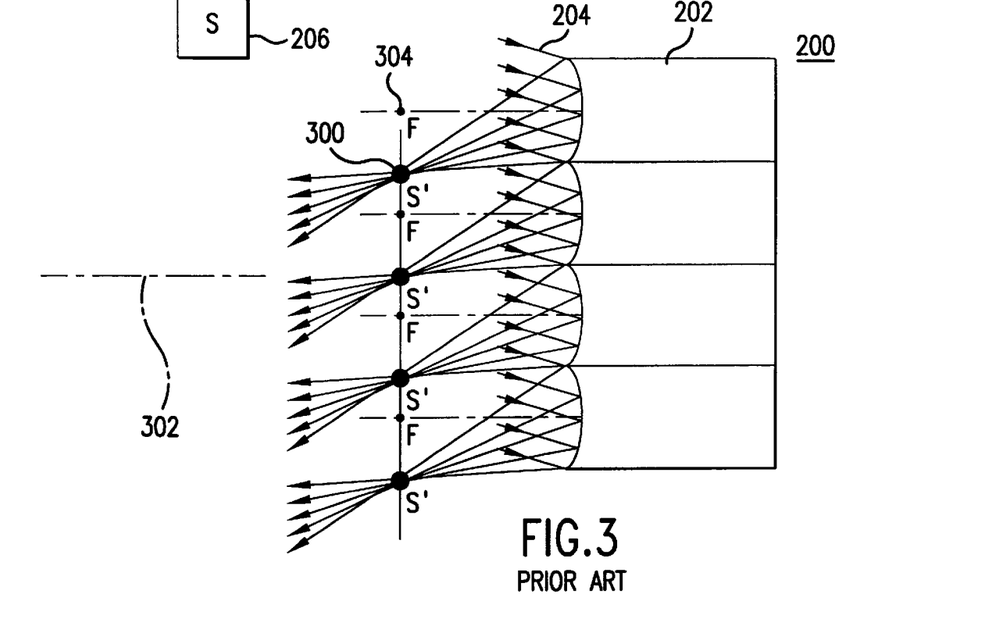
FIG. 3 is a spherical reflective fly's eye array with the collimated light incident upon the spherical reflective elements from off-axis.

FIG. 3 is the spherical reflective fly's eye array 200 shown in FIG. 2 with the collimated radiation 204 incident on the individual fly's eye spherical mirrorlets 202 from an off-axis source S 206. By having the radiation 204 incident on the mirrorlets 202 from an off-axis location, the imaged secondary point sources S' 300 can be accessed since the reflected radiation is no longer co-axial with the optical axis 302 and the incident collimated radiation 204. However, since the radiation 204 is incident on the individual fly's eye spherical mirrorlets 202 from an off-axis direction, the imaged secondary point sources S' at 300 are not coincident with the focal points F 304 of the individual spherical mirrorlets 202. As a result, large amounts of coma are introduced into the imaged secondary point sources S' 300 making the array of imaged secondary point sources less than ideal. The coma is in addition to the spherical aberration introduced by the spherical mirrorlets 202.

Figure 4:
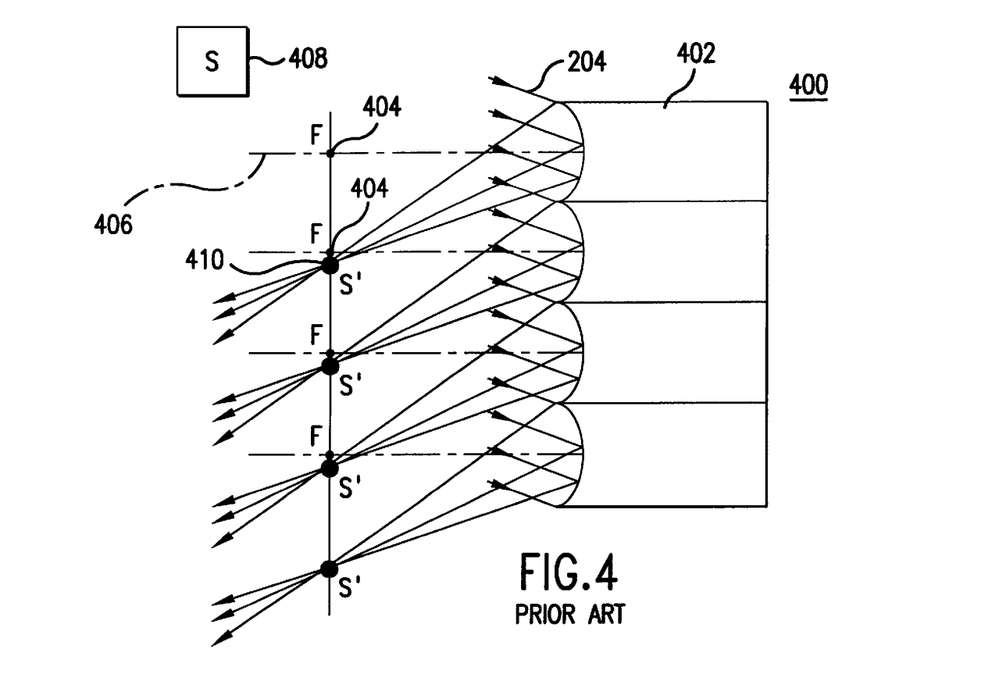
FIG. 4 is a parabolic reflective fly's eye array with the collimated light incident upon the parabolic reflective elements from off-axis.

Referring to FIG. 4, there is shown a parabolic reflective fly's eye array 400 that corrects the spherical aberration introduced by the spherical reflective fly's eye array 200 shown in FIG. 3. The parabolic reflective fly's eye array 400 is made up of individual parabolic reflective segments 402. The individual parabolic reflective segments 402 are based on an axial segment of a parent parabolic surface. Because the individual parabolic reflective segments 402 are based on an axial segment of a parent parabolic surface, the focal point F 404 of each individual parabolic reflective segment 402 is coaxial with the optical axis 406 of the individual parabolic reflective segment 402. The collimated radiation 204 is incident on the individual parabolic reflective segments 402 from an off-axis source S 408. The imaged secondary point sources S' at 410 are not coincident with the focal points F 404 of the individual parabolic mirrorlets 402. As a result, large amounts of coma are introduced into the imaged secondary point sources S' 410 making the array of imaged secondary point sources S' 410 less than ideal. Although the parabolic reflective fly's eye array 400 does not introduce spherical aberration, excessive amounts of coma are introduced.

Figure 5A:
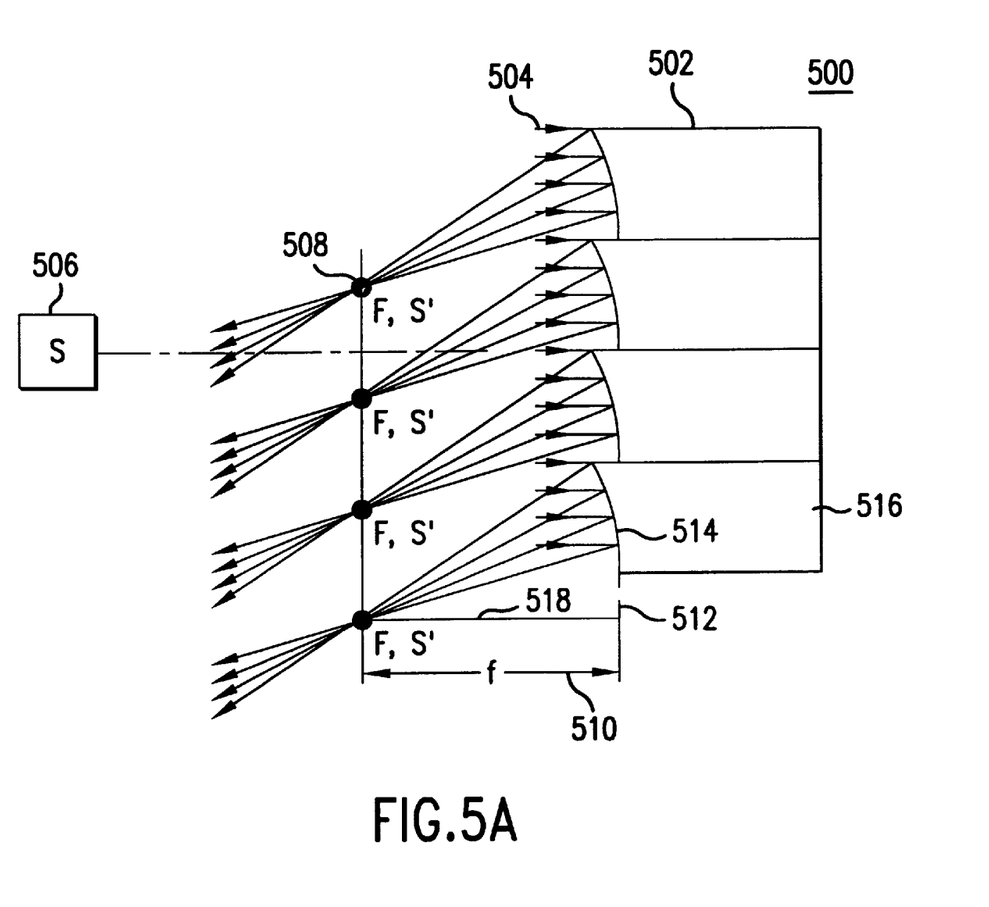
FIG. 5A is a first embodiment of a parabolic reflective fly's eye array in accordance with the present invention with the collimated light incident upon the parabolic reflective elements from on-axis.

Referring to FIG. 5A, there is shown an optical integrator made up of a parabolic reflective fly's eye array 500 in accordance with one embodiment of the present invention. The parabolic reflective fly's eye array 500 is preferably made up of individual parabolic reflective segments 502. The individual parabolic reflective segments 502 are formed from an off-axis segment of a parent parabolic surface. Since each of the parabolic mirror segments 502 are based on the same off-axis segment of the parent parabolic surface (as will be described in more detail below) the resulting array 500 is made up of substantially identical parabolic reflective segments. However, as those skilled in the art will appreciate, the uniformity of the parabolic segments 502 may be varied to compensate for any known variations in the preceding or succeeding optical system. The method of determining the conic parameters of the segment of the parent parabolic surface in order to form the individual parabolic segments 502 will be discussed below in conjunction with FIGS. 5B & 5C. The collimated radiation 504 is incident on the individual parabolic reflective segments 502 from a coaxial source S 506. The imaged secondary point sources S' 508 are accessible since the reflected radiation is not coaxial with the incident collimated radiation 504. Because the imaged secondary point sources S' at 508 are coincident with the focal points F at 508 of each individual parabolic reflective segment 502, the imaged secondary point sources S' 508 are aberration free. The focal distance f 510 of each individual parabolic reflective segment 502 is the focal distance of the parent parabolic surface 512. The individual parabolic reflective segments 502 are arranged so that the focus F 508 of each segment 502 is in a plane perpendicular to the propagation direction of the incident collimated radiation 540. The parent parabolic surface 512 is shown extended from the parabolic surface 514 of the parabolic segment 516. As can be appreciated, the line 518 would be the axis of the parent parabolic surface 512. A clearer representation of the parent parabolic surface 512 will be provided in conjunction with the discussion of FIGS. 6–8.

Figure 5B:
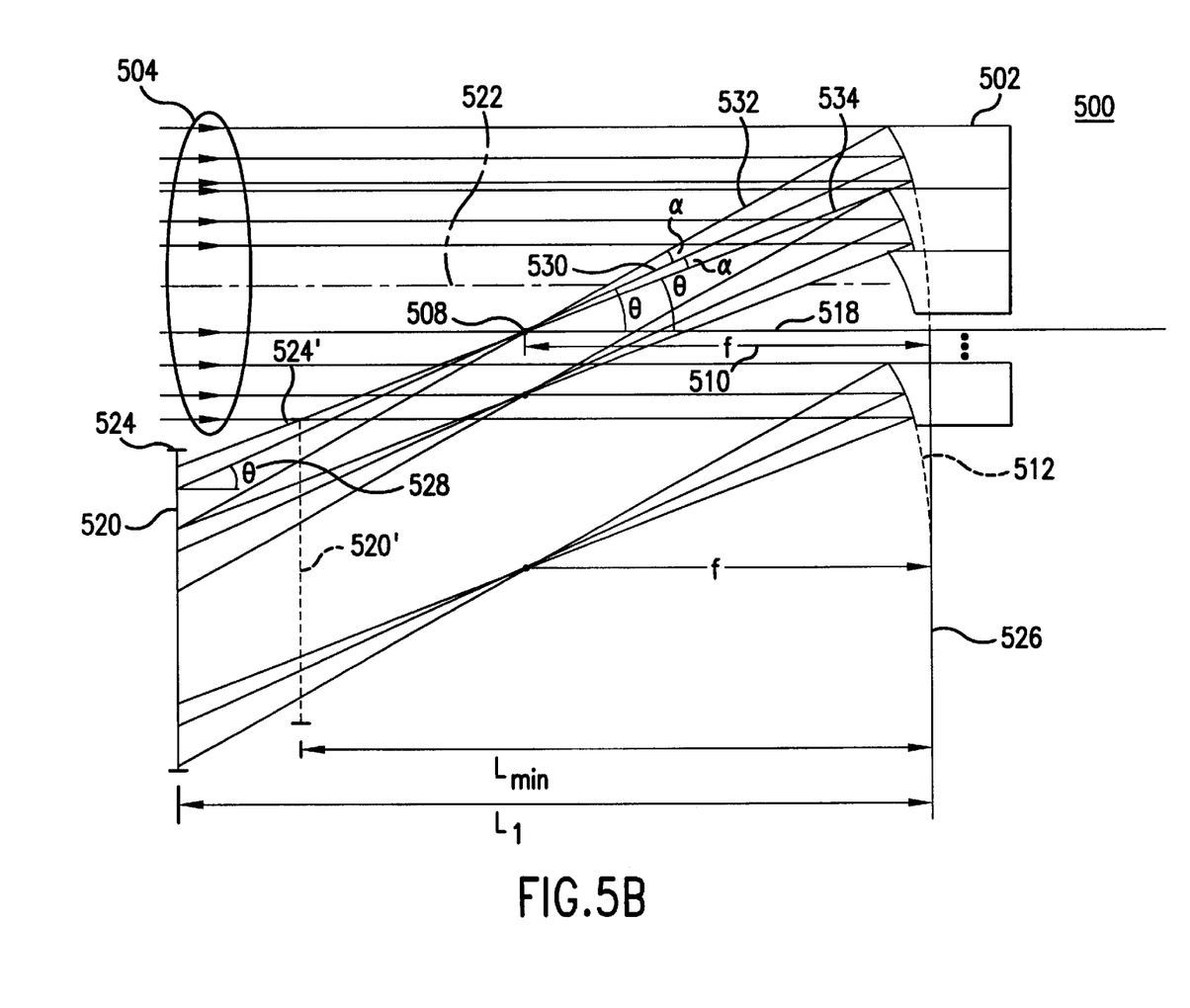
FIG. 5B is a section of the parabolic reflective fly's eye array shown in FIG. 5A showing details of construction.

Referring to FIG. 5B, there is shown the relationships of the parameters of the individual parabolic reflective segments 502 making up the parabolic reflective fly's eye array 500. The reflective fly's eye array 500 is disposed between a source (not shown) of collimated radiation 504 and a working surface 520. The working surface 520 could be the first surface of a projection optics system or it could be a relay surface that re-images the secondary point sources 508 into the pupil of a projection optic system. The parabolic reflective segments 502 are constructed in the array with the same orientation relative to the optical axis 522. The parameters determining the parabolic segment are determined as follows. The initial constraint is that the upper edge 524 of the working surface 520 must be outside the collimated beam 504. As can be appreciated, the working surface 520 can be located at several locations as shown in FIG. 5B. For example, the working surface 520 is shown at a first location at a distance $L_1$ from the plane 526. The plane 526 is tangent to the parent parabolic surface 512 at the axis 518 of the parent parabolic surface 512. The working surface 520' is shown at a second location at a distance $L_{min}$ from the plane 526. The distance $L_{min}$ indicates that the working surface cannot be moved closer to the plane 526 because the upper edge 524' would intrude into the collimated beam 504. The working surface 520 can be located at distances greater than $L_1$ from the plane 526. Alternatively, if the parameters of the parabolic segment 502 are selected to increase the angle at which the radiation is reflected, that is, increasing the angle θ 528, the working surface 520 can be located closer to the plane 526. The angle θ 528 is the angle between the ray 530 and the axis 518 of the parent parabolic surface 512. The ray 530 is the angular bisector of the angle between rays 532 and 534. The ray 532 is the ray reflected from an upper edge of the parabolic segment 502 and the ray 534 is the ray reflected from a lower edge of the parabolic segment 502. The angle θ is also the angle at which the ray 530 is incident on the working surface 520. Angle α is the semi-divergence angle of the rays reflected from the parabolic segment 502 in the meridional plane and is shown as the angle between the ray 530 and the ray 532. The angle a is also the angle between the ray 530 and the ray 534.

Figure 5C:
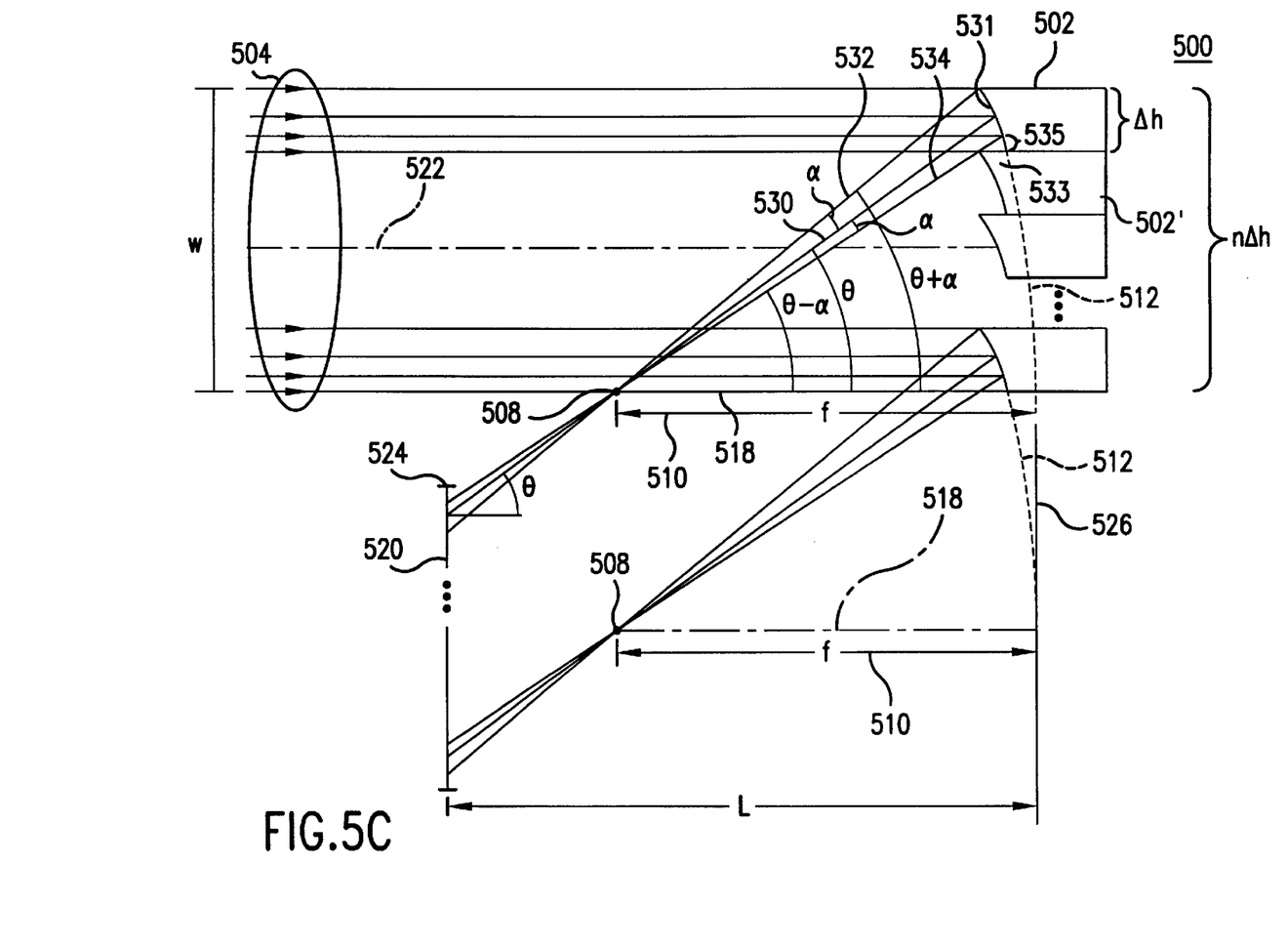
FIG. 5C is detailed section of the parabolic reflective fly's eye array shown in FIG. 5A showing details of determining parabolic parameters.

Referring to FIG. 5C there is shown a detailed section of the parabolic fly's eye array 500 shown in FIG. 5A. The method of determining the parabolic segment 502 to be used is described in conjunction with FIG. 5C. Given the width w of the incident collimated radiation 504 available from the overall optical system, and the distance L at which the working surface 520 is to be located from the plane 526 the desired number of parabolic segments 502 is n. The relationship between the width w and the height Δh of each parabolic segment 502 is w=nΔh. The angle θ is the desired angle at which the angular bisector ray 530 is to strike the working surface 520 and is typically a known value. With the angle θ known, and with Δh determinable from Δh=w/n, angle α, which is the semi-divergence angle of rays reflected from the parabolic segment 502 in the meridional plane, can be determined. The angle a is shown in FIG. 5C as the angle between the rays 530 and 532 and as the angle between the rays 530 and 534. Alternatively, if a specific value of the secondary source divergence is given, complimentary calculations can be made to determine the specific value of Δh and, in turn, the specific values of w and n, which optimally fulfill the physical constraints of a specific system geometry. FIG. 5C illustrates inefficiency in the array 500. This inefficiency is caused by a portion of the beam reflected from each individual parabolic segment 502 being obscured. The placement of an upper parabolic segment 502 on the next lower parabolic segment 502' results in the lower parabolic segment extending beyond the parabolic reflecting surface 531 of the upper parabolic segment 502. The extension is shown at 533. The extension 533 blocks a portion 535 of the incident radiation 504 from reaching the working surface 520. As can be appreciated, this extension 533 is dependent upon the distance from the axis 518 of the parent parabolic surface 512 from which the segments 502 & 502' are based. The larger the distance from the axis 518 of a given parent parabolic surface 512, the greater the extension 533.

Figure 5D:
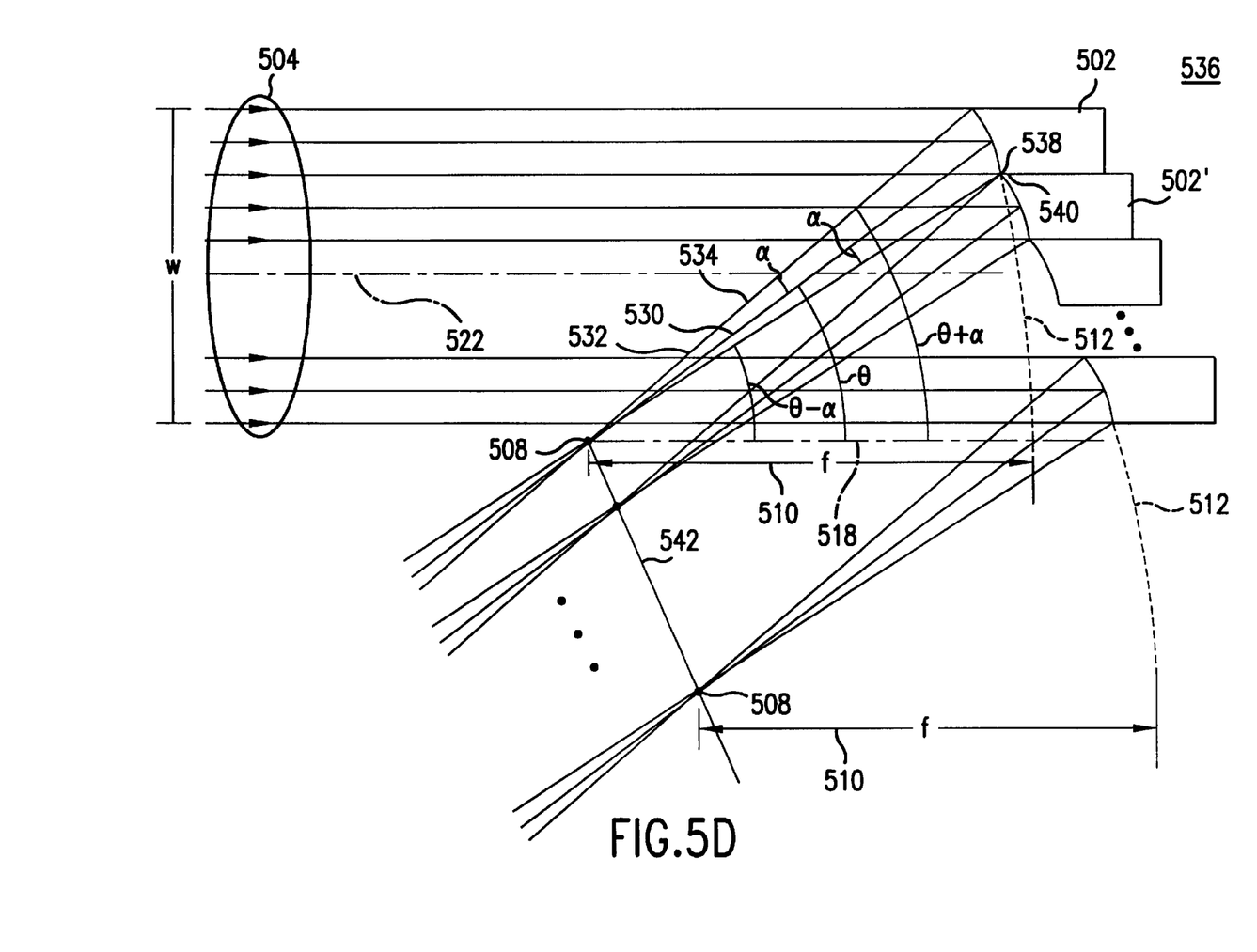
FIG. 5D is a second embodiment of a parabolic reflective fly's eye array in accordance with the present invention with the collimated light incident upon the parabolic reflective elements from on-axis.

Referring to FIG. 5D, there is shown a second embodiment of a parabolic reflective fly's eye array 536 in accordance with the present invention. The array 536 avoids the inefficiency identified above in relation to the array 500 shown in FIG. 5C. The collimated radiation 504 is incident upon the parabolic reflective elements 502 from on-axis. The parabolic reflective fly's eye array 536 has the individual parabolic mirror segments 502 arranged so that the lower edge 538 of parabolic mirror segment 502 is coincident with the upper edge 540 of the parabolic mirror segment 502' and thus, there is no extension of the lower parabolic mirror segment 502' that blocks a portion of the reflected beam from the parabolic mirror segment 502. This arrangement of the individual parabolic mirror segments 502 results in an image plane 542 that is tilted with respect to the optical axis 522 of the array 536. The amount of tilt can be selected by selecting a different section of the parent parabolic surface 512 from which the individual segments 502 are based. As can be appreciated, by selecting a section of the parent parabolic surface 512 that is further away from the axis 518 of the parent parabolic surface 512 the greater the angle of tilt, measured relative to the axis 518 of the parent parabolic surface 512.

Figure 6:
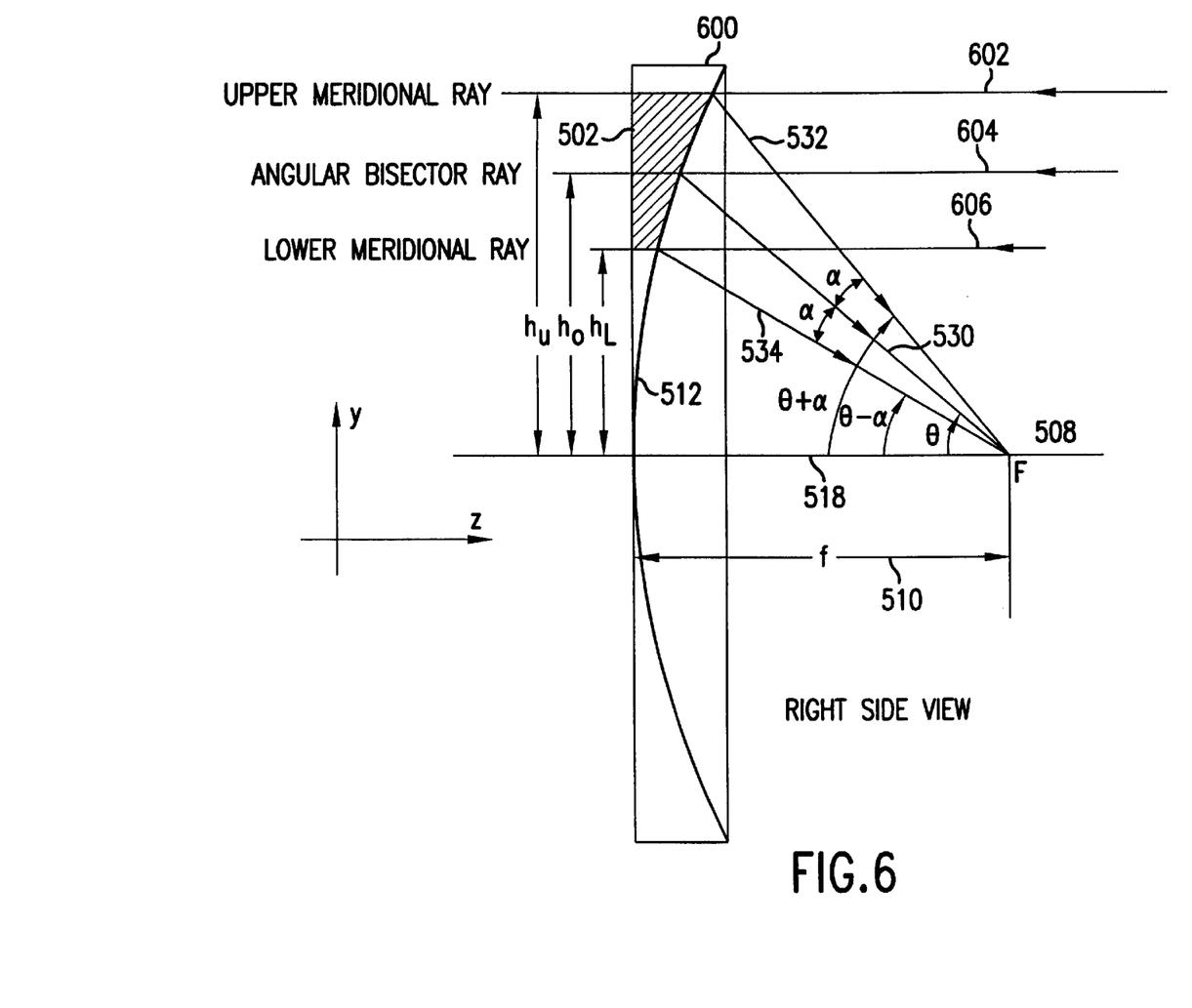
FIG. 6 is a right side view of a single parabolic fly's eye element illustrating parameters used in the manufacture of the parabolic mirror segment.

FIG. 6 is a right side view of a parent parabolic section 600 from which the parabolic segments 502 are based. An upper meridional ray 602, an angular bisector ray 604 and a lower meridional ray 606 are shown incident upon the parent parabolic section 600. The axis of the parent parabolic section 600 is shown at 518 and the focal point F of the parent parabolic section 600 is shown at 508. The angle θ is the angle between the reflected angular bisector ray 530 and the axis 518 of the parent parabolic section 600. The value $h_O$ is the height of the angular bisector ray 604 above the axis 518. The semi-divergence angle α is the angle between the reflected angular bisector ray 530 and the reflected upper meridional ray 532 measured at the focal point F 508. The semi-divergence angle α is also the angle between the reflected angular bisector ray 530 and the reflected lower meridional ray 534 measured at the focal point F 508. The value $h_U$ is the height of the upper meridional ray 602 above the axis 518 and the value $h_L$ is the height of the lower meridional ray 606 above the axis 518. The crosshatched portion is the parabolic segment 502 defined by the values $h_O$, α and θ.

The fundamental parabolic surface equation is:

$$x^2+y^2=4fz.$$

In the meridional plane, x=0 and the surface equation reduces to:

$$y^2=4fz.$$

From the equation $\tan\theta=(4fh_O)/(4f^2-h_O^2)$ the value for f can be calculated from:

$$f=(h_O/2 \tan\theta)(1+[1+\tan^2\theta]^{1/2})$$

where θ is given and $h_O$ is calculated as discussed above.
From the equation:

$$\tan(\theta+\alpha)=4fh_U/(4f^2-h_U^2),$$

the value of $h_U$ can be calculated as follows:

$$h_U=(2f/\tan(\theta+\alpha))(-1[1+\tan^2(\theta+\alpha)]^{1/2}).$$

From the equation:

$$\tan(\theta-\alpha)=4fh_L/(4f^2-h_L^2),$$

the value of $h_L$ can be calculated as follows:

$$h_L=(2f/\tan(\theta-\alpha))(-1+[1+\tan^2(\theta-\alpha)]^{1/2}).$$

Figure 7:
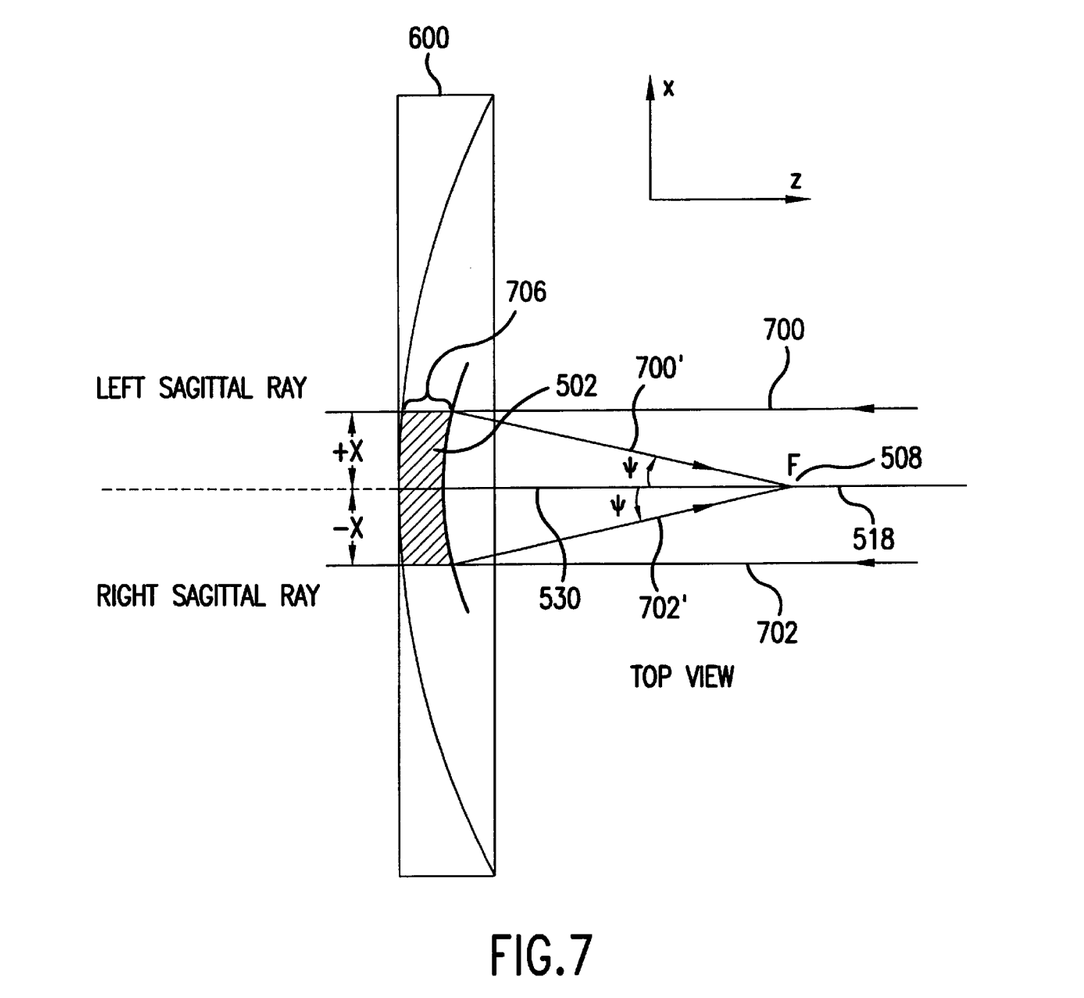
FIG. 7 is a top view of the single parabolic fly's eye element shown in FIG. 6 illustrating additional parameters used in the manufacture of the parabolic mirror segment.

FIG. 7 is a top view of the parent parabolic section 600 from which the parabolic segments 502 are based. A left sagittal ray 700 is shown incident on the parent parabolic section 600 and a right sagittal ray 702 is shown incident on the parent parabolic section 600. The axis of the parent parabolic section 600 is shown at 518 and the focal point F of the parent parabolic section 600 is shown at 508. The angle ψ is the angle between the reflected left sagittal ray 700' and the axis 518 and is also the angle between the reflected right sagittal ray 702' and the focal plane 704. The values ±x, added together=2x and represent the width of the parabolic segment 502 and are calculated as follows. In the sagittal plane FIG. 7, x≠0 and the values of ±x are calculated as follows:

$$x(h)=\pm\{([(4f)^2+1]\tan^2\psi)/([(4f)^2-\tan^2\psi])\}h,$$

where h is the height from the axis 518 of the parent parabolic surface 512 at which a specific ray is incident upon the parent parabolic surface 512. Referring to FIG. 6 the value of h can be $h_O$, $h_U$, or $h_L$ as defined and discussed above. Since the segment width (2x) is dependent on the height at which the segment is defined, for simplicity the value of x is chosen for h=$h_O$ where $h_O$ is the height at which the angular bisector 530 is incident upon the parent parabolic surface. Therefore, the values of ±x are calculated as follows:

$$x(h=h_O)=\pm\{([(4f)^2+1]\tan^2\psi)/([(4f)^2-\tan^2\psi])\}h_O.$$

The crosshatched section shows the face of the parabolic segment 502 that is formed.

Figure 8:
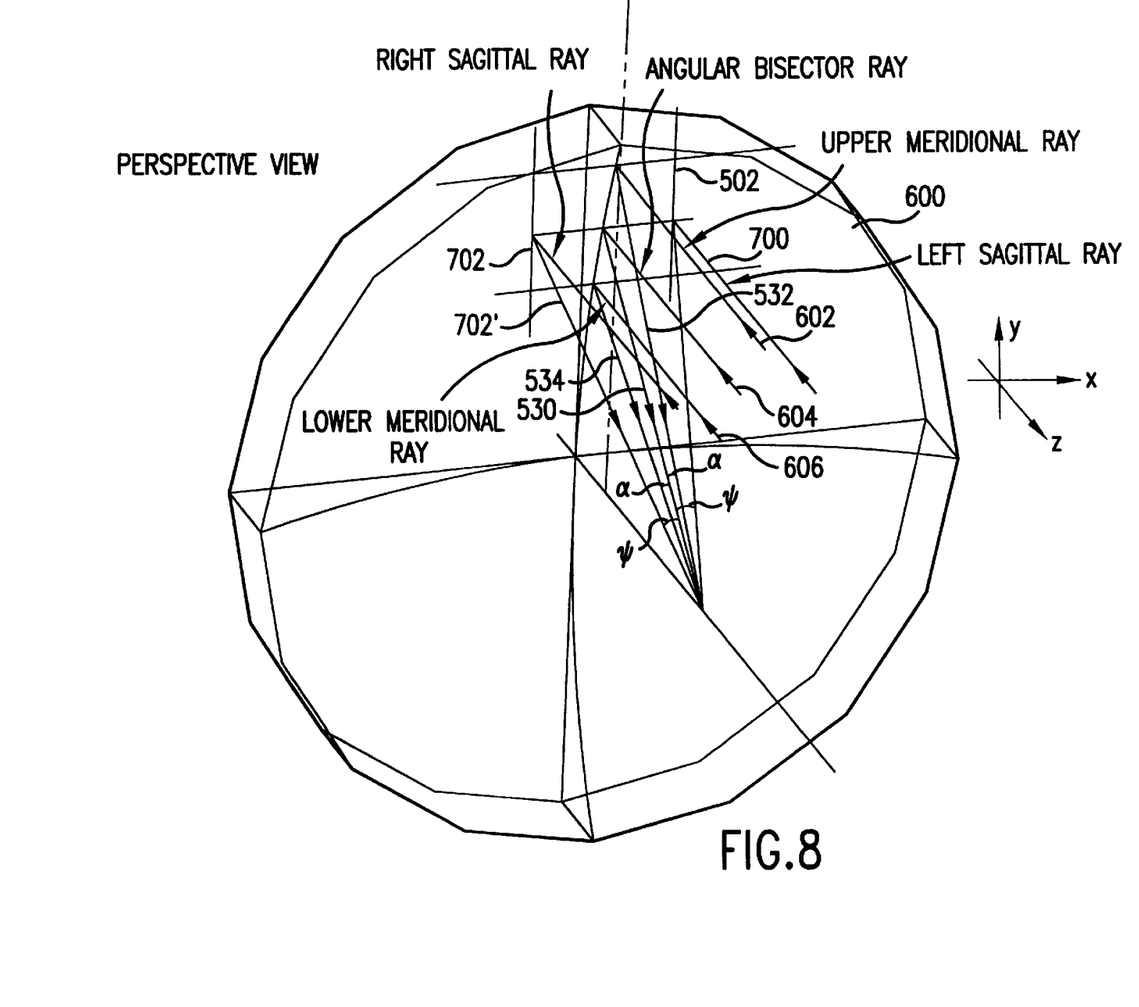
FIG. 8 is a perspective view of the single parabolic mirror segment shown in FIGS. 6 & 7 illustrating further the parameters used in the manufacture of the parabolic mirror segment.

FIG. 8 is a perspective view of the parent parabolic section 600 from which the parabolic segment 502 is constructed. The parabolic segment 502 is shown shaded and as should be appreciated the boundaries of the parabolic segment 502 are curved.

In summary, the optical integrators of the present invention provides an array of aberration free secondary point sources that are used to obtain extremely uniform illumination that can be used in various optical systems such as a projection optical system.

The foregoing description of the embodiments of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An optical integrator for intercepting radiation from a source and forming a plurality of source images, said optical integrator comprising a two-dimensional array of mirror segments, wherein each of said mirror segments has a reflecting surface shape based on an off-axial segment of a parent parabolic surface, and wherein each reflecting surface shape converges said radiation from said source to form an individual source image of said plurality of source images.

2. The optical integrator of claim 1 wherein the mirror segments are arranged so that the focus of each mirror segment lie in a plane.

3. The optical integrator of claim 2 wherein the two dimensional array of mirror segments is configured to be illuminated with collimated radiation parallel to an axis of the parent parabolic surface.

4. The optical integrator of claim 3 wherein the shapes of the mirror segments are determined by parameters $h_o$, θ, α, and ψ, wherein $h_o$ is an intercept height of an angular bisector ray in a meridional plane of the off-axis sections of said parent parabolic surface, θ is an angle of the angular bisector ray in the meridional plane of the off-axis section of said parent parabolic surface, α is a semi-divergence angle of the rays reflected from each mirror segment, and ψ is a semi-divergence angle of the rays reflected from each mirror segment in a plane which contains the angular bisector ray and is orthogonal to the meridional plane.

5. The optical integrator of claim 4 wherein the shapes of the mirror segments are further determined by a parameter f where f is a focal length of the parent parabolic surface.

6. The optical integrator of claim 5 wherein the parameter f is determined as follows:

$$f=(h_O/2\tan\theta)(1+[1+\tan^2\theta]^{1/2}).$$

7. The optical integrator of claim 6 wherein the shapes of the mirror segments are further determined by parameters $h_U$ and $h_L$ wherein $h_u$ is a surface intercept height of an upper ray in the meridional plane and $h_L$ is a surface intercept height of a lower ray in the meridional plane.

8. The optical integrator of claim 7 wherein:

$$h_U=(2f/\tan(\theta+\alpha))(-1+[1+\tan^2(\theta+\alpha)]^{1/2}).$$

9. The optical integrator of claim 8 wherein:

$$h_L=(2f/\tan(\theta-\alpha))(-1+[1+\tan^2(\theta-\alpha)]^{1/2}).$$

10. The optical integrator of claim 9 wherein the shapes of the mirror segments are further determined by a parameter x where 2x represents a width of each of the mirror segments.

11. The optical integrator of claim 10 wherein x is determined as follows:

$$x=\{([(4f)^2+1]\tan^2\psi)/([(4f)^2-\tan^2\psi])\}h_O.$$

12. A method of obtaining a two dimensional array of aberration-free source images comprising directing collimated radiation from a source onto an optical integrator according to claim 1 thereby forming said two dimensional array of aberration-free source images.

13. The method of claim 12 further comprising arranging the mirror segments so that the focus of each mirror segment lie in a plane.

14. The method of claim 13 further comprising directing the incident collimated radiation from a direction parallel to an axis of the parent parabolic surface.

15. The method of claim 14 wherein directing the collimated radiation onto said two dimensional array of mirror segments comprises directing the collimated radiation onto said two dimensional array of mirror segments whose shapes are determined by parameters $h_o$, θ, α, and ψ, where $h_o$ is an intercept height of an angular bisector ray in a meridional plane of the off-axis section of said parent parabolic surface, θ is an angle of the angular bisector ray in the meridional plane of the off-axis section of said parent parabolic surface, α is a semi-divergence angle of the rays reflected from each mirror segment, and ψ is a semi-divergence angle of the rays reflected from each mirror segment in a plane which contains the angular bisector ray and is orthogonal to the meridional plane.

16. The method of claim 15 wherein the mirror segments are further defined by a parameter f where f is a focal length of the parent parabolic surface.

17. The method of claim 16 wherein the parameter f is determined from the relationship:

$$f=(h_O/2\tan\theta)(1+[1+\tan^2\theta]^{1/2}).$$

18. The method of claim 17 wherein the shapes of the mirror segments are further determined by parameters $h_U$ and $h_L$ wherein $h_U$ is a surface intercept height of an upper ray in the meridional plane and $h_L$ is a surface intercept height of a lower ray in the meridional plane.

19. The method of claim 18 wherein the parameter $h_U$ is determined from the relationship:

$$h_U=(2f/\tan(\theta+\alpha))(-1+[1+\tan^2(\theta+\alpha)]^{1/2}).$$

20. The method of claim 19 wherein the parameter $h_L$ is determined from the relationship:

$$h_L=(2f/\tan(\theta-\alpha))(-1+[1+\tan^2(\theta-\alpha)]^{1/2}).$$

21. The method of claim 20 wherein the shapes of the mirror segments are further determined by a parameter x where 2x represents a width of each of the mirror segments.

22. The method of claim 21 wherein the parameter x is determined as follows:

$$x=\{([(4f)^2+1]\tan^2\psi)/([(4f)^2-\tan^2\psi])\}h_O.$$

23. The method of claim 12, wherein each of said mirror segments has the same shape.

24. The optical integrator of claim 1, wherein each of said mirror segments has the same shape.

* * * * *

UNITED STATES PATENT AND TRADEMARK OFFICE
CERTIFICATE OF CORRECTION

PATENT NO. : 6,231,198 B1
DATED : May 15, 2001
INVENTOR(S) : Leslie D. Foo

It is certified that error appears in the above-identified patent and that said Letters Patent is hereby corrected as shown below:

<u>Title page,</u>
Item [56], References Cited, U.S. PATENT DOCUMENTS, insert
-- 5,581,605   12/03/96   Murakami et al.   378/84 --

Signed and Sealed this

Twenty-fourth Day of September, 2002

*Attest:*

*Attesting Officer*

JAMES E. ROGAN
*Director of the United States Patent and Trademark Office*